United States Patent Office 3,163,233
Patented Dec. 29, 1964

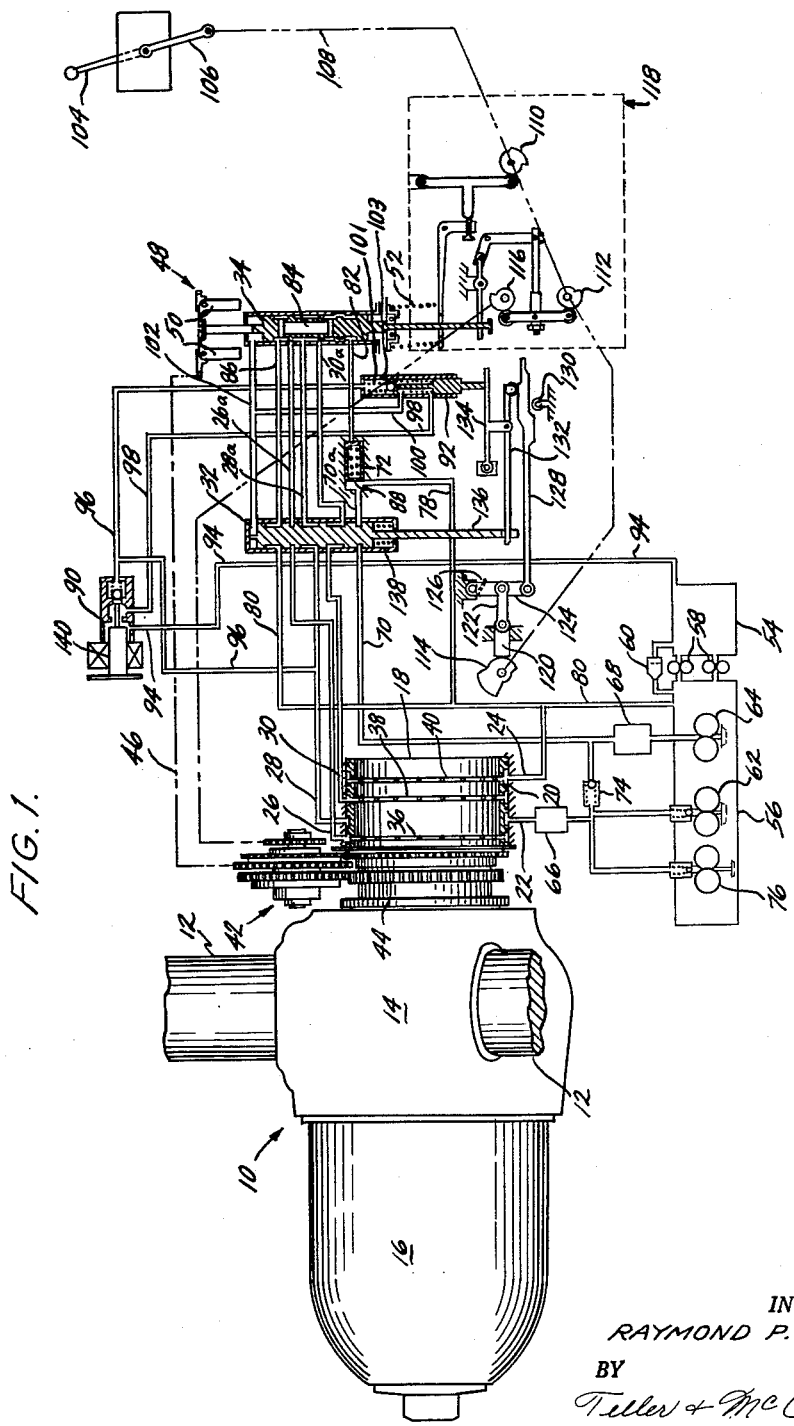

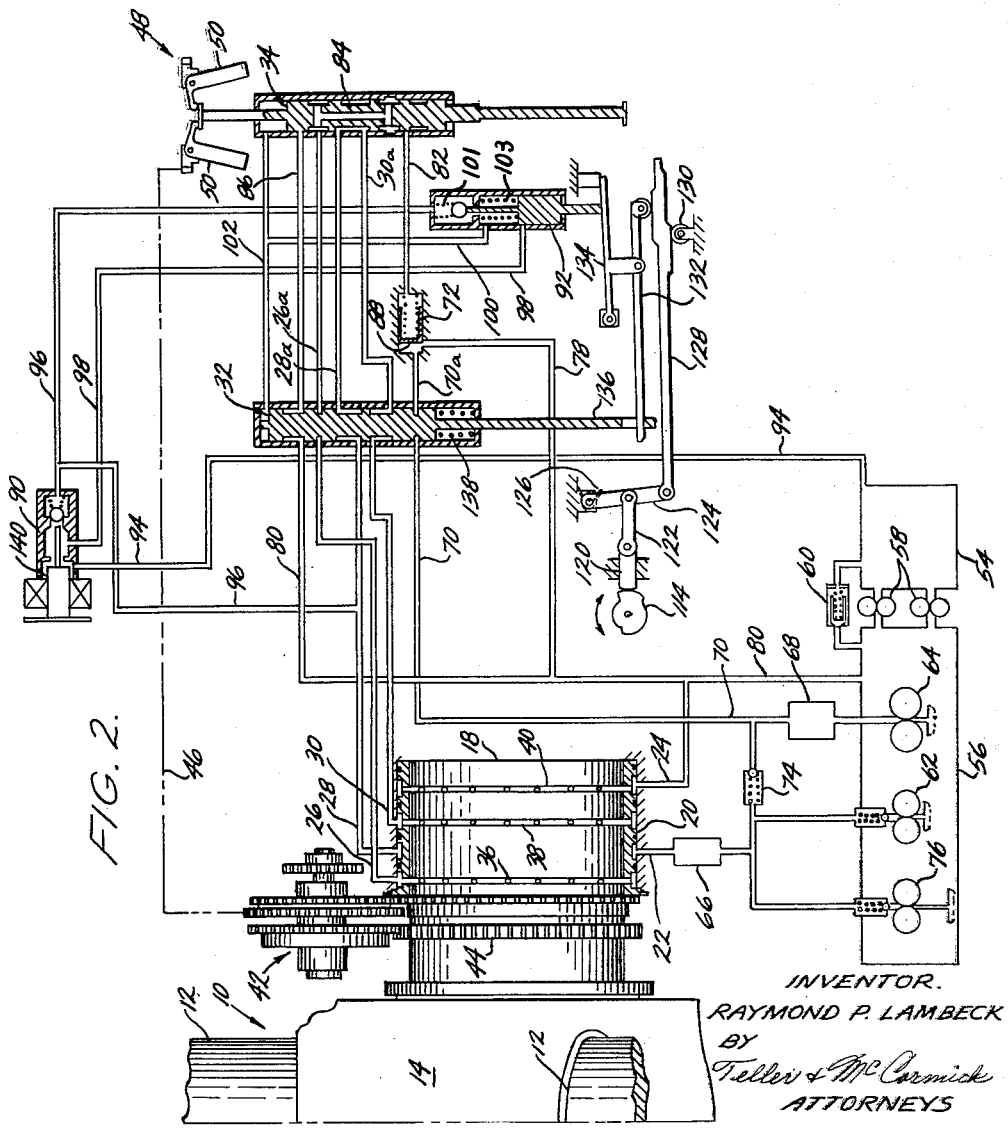

1

3,163,233
AERONAUTICAL PROPELLER HAVING SAFETY
MEANS FOR PROPELLER FEATHERING
Raymond P. Lambeck, St. Petersburg, Fla., assignor to
United Aircraft Corporation, East Hartford, Conn., a
corporation of Delaware
Filed Nov. 29, 1956, Ser. No. 625,045
9 Claims. (Cl. 170—160.31)

This invention relates to an improved aeronautical propeller and, more specifically, to an hydraulic system for controlling the pitch of such a propeller.

It is the general object of the invention to provide in an hydraulic system for an aeronautical propeller safety means to cause feathering of the propeller blades under conditions where it is impossible properly to operate one or more of the devices within the system which are normally employed in the feathering operation.

It is a further object of the invention to provide safety means capable of operation under the conditions mentioned and which is operable by the same means employed normally to operate or actuate the inoperative normally used device or devices.

Other objects of the invention as well as features of construction in accordance therewith will become apparent to those skilled in the art from the following description having reference to the attached drawings wherein, by way of preferred example only, one embodiment of the invention is shown. It should be understood, however, that the drawings and description of the presently preferred embodiment are not to be taken in a limiting sense or as defining the scope of the invention, the claims forming a part of this specification being relied upon for that purpose.

In the drawings,

FIG. 1 is a schematic view of an aeronautical propeller and its control system; and FIG. 2 is an enlarged fragmentary view similar to FIG. 1 and showing the safety means in an operating condition.

In the views of the drawings, the reference numeral 10 designates generally a propeller assembly which includes a plurality of adjustable pitch propeller blades 12, 12 and a hub 14 having a nose section 16. The propeller assembly is conventional in that a mechanism comprising an hydraulic motor (not shown) disposed within the nose 16 is utilized to change the angular disposition or pitch of the blades 12, 12. A typical hydraulic motor for the aforesaid purpose may comprise a cylinder and a piston which is movable within the cylinder responsive to hydraulic pressure introduced to the cylinder on either side of the piston. Thus, the piston is reciprocable within the cylinder and can be moved selectively therein. By means of cam slots and cam rollers, rectilinear movement of the piston within the cylinder can rotate a gear within the hub 14 which is engaged with gears or segments on the inner ends of the propeller blades 12, 12 whereby to change the pitch of the blades by rotation of the same on their generally longitudinal pitch change axes. Thus, movement of the piston within the nose cylinder in one direction is employed to effect a change in the pitch angle toward high pitch and movement of the piston in the opposite direction is used to effect a change toward low pitch. An hydraulic motor of the type referred to is shown in the Anderson Patent No. 2,653,668 and there is a further showing and description of an hydraulic motor of the type mentioned in the Pearl Patent No. 2,703,148 to which reference may be had. Pitch changing mechanism of this type is used to feather the propeller blades and to reverse their pitch as well as to effect the more routine pitch adjustments.

2

Obviously, an hydraulic motor of the aforedescribed type can be operated if there is a distributor valve provided to route hydraulic fluid under pressure selectively to one side or to the other side of the motor piston while connecting the opposite side to drain. Such a distributor valve can be considered as an element of the pitch changing mechanism or it can be considered as an element in an hydraulic control system for the said mechanism. While a distributor valve adapted to function in the aforedescribed way may take various forms, the exemplary distributor valve used in the system to be described is annular and comprises an inner ring or section 18 which rotates with the propeller assembly 10 and an outer ring or section 20 which does not rotate but which embraces the said inner ring.

It will be observed that a plurality of conduits 22, 24, 26, 28 and 30 are connected to the outer, non-rotatable section 20 of the distributor valve. The conduit 22 communicates with a source of hydraulic fluid under pressure as will be described hereinafter, but it does not introduce the hydraulic fluid to the pitch changing mechanism. That is, the valve section 20 is constructed and arranged to connect the conduit 22 with the conduit 28 which extends to a feathering valve 32. Thus, fluid at source or pump pressure is directed to the feathering valve before it is introduced to the pitch changing mechanism. The feathering valve 32 is normally positioned as shown in the drawings to pass the fluid from the conduit 28 to a conduit 28a and on to a pilot or control valve 34. The pilot valve operates to pass the fluid at pump pressure from the conduit 28a to a conduit 26a or to a conduit 30a which respectively communicate at the feathering valve 32 with the conduits 26 and 30.

The conduit 26 at the distributor valve communicates through the non-rotatable valve section 20 with an annular port 36 in the rotatable section 18 and the conduit 30 at the distributor valve communicates through the non-rotatable section with an annular port 38 in the rotatable section. The ports 36 and 38 are respectively connected with passage means (not shown) to opposite sides of the piston in the hydraulic motor, the arrangement being such that when pressurized hydraulic fluid is introduced through the port 36 from the conduit 26, the blade angle is decreased toward low pitch and when hydraulic fluid is introduced under pressure through the passage 38 from the conduit 30, the blade angle is changed toward high pitch. Accordingly, the conduit 26 can be called a low pitch inlet conduit for the pitch changing mechanism and the conduit 30 can be called a high pitch inlet therefor. The rotatable valve section 18 has another annular port 40 which receives hydraulic fluid under drain pressure from the hydraulic motor, this port being connected with the conduit 24 which extends to a main drain conduit to be described.

As its name would imply, the feathering valve 32 is operated only to connect the pump conduit 28 with the high pitch conduit 30 in a feathering operation. At all other times, the feathering valve 32 remains in the position shown in the drawings whereby to effect communication between the low pitch conduit 26 and the conduit 26a extending to the pilot valve 34; between the pump conduit 28 and the conduit 28a extending to the pilot valve; and between the high pitch conduit 30 and a conduit 30a extending to the pilot valve. In normal operation, only the pilot valve 34 is moved to effect selective connection between the pump conduit and the low and high pitch conduits whereby to bring about the routine pitch changes which for purposes of consideration here do not include "feathering" and "reversing." The pilot or control valve 34 can be moved in routine operation either by automatic speed responsive mechanism or by manually actuated mechanism. At this point, only the automatically operable speed responsive mechanism will be described.

The said automatically operable mechanism is responsive to propeller speed and is driven by the propeller. More specifically, a differential gear unit indicated generally at 42 is arranged to be driven by a gear 44 which is rotatable with the propeller assembly 10 and the differential unit 42 is connected as indicated schematically by the line 46 with the speed responsive mechanism 48 which controls the position of the pilot valve 34. The flyweights 50, 50 forming a part of the mechanism 48 are arranged to be thrown outwardly by centrifugal force during rotation of the propeller assembly and to bear against the valve 34 thrusting it downwardly. The greater the propeller speed, the farther downwardly the valve 34 will be thrust. As is best shown in FIG. 2, when the pilot valve is thrust downwardly, it effects a connection between the pump conduit 28a and the high pitch conduit 30a whereby the pitch changing mechanism is operated to effect a change toward high pitch which reduces propeller speed. If the propeller speed is low, the flyweights 50, 50 will be retracted and the pilot valve 34 will be thrust upwardly by a spring 52 engaging the bottom of the pilot valve. When the pilot valve is thrust upwardly from the position shown in FIG. 1, it connects the pump conduit 28a with the low pitch conduit 26a whereby the pitch changing mechanism is operated to effect a change toward low pitch which will increase propeller speed.

Referring now to the hydraulic system in greater detail, it will be seen that the source of pressurized hydraulic fluid includes an atmospheric sump 54 and a pressurized sump 56. Hydraulic fluid is transferred from the atmospheric sump 54 and introduced under pressure to the pressurized sump 56 by one or more pumps 58, 58. A relief valve 60 is located in a conduit between the pressurized sump and the atmospheric sump to drain fluid from the pressurized sump into the atmospheric sump when necessary.

The hydraulic fluid is withdrawn from the pressurized sump 56 and introduced to the system under additional pressure by means of a main pump 62 and a standby pump 64. The main pump and the standby pump are preferably driven by the propeller and to this end a driving connection (not shown) can be effected between the differential gearing 42 and the said pumps. Normally, only the main pump 62 supplies hydraulic fluid to the conduit 22 through a filter 66 and the standby pump 64 pumps the fluid through a filter 68 into a conduit 70. The conduit 70 extends to the feathering valve 32 and normally communicates therethrough with a conduit 70a which extends to a standby valve 72 as will be described hereinafter. However, when the passage 70 is blocked at the feathering valve 32, as will be described, the increased pressure in the conduit 70 will open a check valve 74 causing flow from the standby pump 64 to enter the distributor valve conduit 22 through the filter 66. During periods when the propeller is not driven, the hydraulic system can be employed to operate the pitch changing mechanism by means of a motor-driven auxiliary pump 76 which passes the hydraulic fluid through the filter 66 into the distributor valve pump inlet conduit 22, the main pumps 62 and 64 not being in operation.

As previously mentioned, during normal propeller operation when only routine pitch changes are required, the feathering valve 32 is positioned as shown in FIGS. 1 and 2 of the drawings. In such position of the feathering valve 32, hydraulic fluid at pump pressure from the source passes through the distributor valve into the conduit 28 which extends to the feathering valve and there communicates with the conduit 28a extending to the pilot valve. When there is no pitch change required, the pilot valve 34 will be positioned as shown in FIG. 1 and in this position, the said pilot valve blocks the end of the conduit 28a. Under the aforesaid conditions of operation, the hydraulic fluid pumped by the standby pump 64 through the conduit 70 and the feathering valve 32 is returned to the pressurized sump through the normally open standby valve 72 and a conduit 78 and a main drain conduit 80. Also, under the aforesaid conditions, there is no hydraulic flow in the conduits 26 and 30 extending from the feathering valve to the distributor valve. That is, the feathering valve 32 is positioned to prevent flow from the pump conduit 28 into either of the conduits 26 or 30 and the pilot valve 34 is positioned to prevent flow from the conduit 28a into either of the conduits 26a or 30a.

However, there will be some flow through the pilot valve 34. That is, a conduit 82 extending from the standby valve 72 communicates through an internal passage 84 in the pilot valve 34 with a conduit 86 extending between the said pilot valve and the feathering valve 32. At the feathering valve 32, the conduit 86 communicates with the main drain conduit 80. The aforesaid flow from the conduit 82 through the pilot valve to drain comes from the standby valve 72 which is connected to the standby pump conduit 70. Most of the fluid from the standby pump conduit is drained in the valve 72 through the conduit 78 as described, but some of the flow passes to the conduit 82 and to the pilot valve through a small aperture 88 provided in the said standby valve. The said aperture may be referred to as a bleed aperture which is provided to create pressure on both sides of the standby valve 72.

In addition to the feathering valve 32, the feathering control structure of this system includes a solenoid operated feather actuating valve 90 and a mechanically operated feather actuating valve 92, both of which are closed as shown in FIG. 1 during the routine pitch changing operation of the system. The solenoid operated feather actuating valve 90 comprises a normally closed check valve which is connected through a drain conduit 94 to the atmospheric sump 54 and which is connected to a conduit 96 containing fluid at source or pump pressure, the conduit 96 being connected with the pump conduit 28. The solenoid operated valve 90 is also connected to a conduit 98 which extends to the mechanically operated feather actuating valve 92. The said solenoid operated feather actuating or check valve 90 is normally closed to prevent flow from the conduit 96 into the drain conduit 94 or into the conduit 98 extending to the other feather actuating valve 92.

At the said other or mechanically operable feather actuating valve 92, free communication is normally provided as shown in FIG. 1 between the conduit 98 and a conduit 100 which extends to a conduit 102, the last mentioned conduit opening into the actuating chambers at the tops of the feathering valve and the pilot valve, respectively. The mechanically operated feather actuating valve 92 also comprises a check valve which is connected to the conduit 96 as well as to the conduits 98 and 100. As shown in FIG. 1, this valve is normally positioned to prevent flow from the conduit 96, having fluid at pump pressure, into either of the conduits 98 or 100, the valve being held in said normal position by a pair of compression springs 101 and 103.

At this point, the operation of the hydraulic system to effect propeller feathering can be considered. It should be understood that propeller feathering can be electrically actuated or mechanically actuated by manually operable means or by a combination of electrical and mechanical actuation. The manually operable mechanical means for feather actuation includes the power lever 104 which the pilot or operator sets in predetermined positions to operate at selected propeller speeds. That is, the power lever is normally set to impose a load on the pilot or control valve 34 conditioning the same to effect pitch control and to maintain propeller speed in keeping with the imposed load. More specifically, the power lever 104 operates a crank 106 which is connected, as schematically indicated by the line 108, to a plurality of cams 110, 112 and 114 and which controls their rotated positions. The cams 110 and 112 along with a cam 116 (which is a feed-back or modulating cam controlled by the differential gearing 42) form part of a motion transmitting mechanism indicated generally by the reference numeral 118 which is conditioned by movement of the power lever and the said cams to vary the load on the pilot valve spring 52. If a relatively low propeller speed is desired, the power lever 104 is positioned to provide a relatively light load on the valve spring 52 whereby the governing weights 50, 50 can fly out and thrust the pilot valve down to effect an increase in propeller pitch at a relatively low speed. If a relatively high speed is desired, the power lever is positioned to impose a relatively heavy load on the valve spring whereby the flyweights can thrust the pilot valve down only at a relatively high propeller speed.

The motion transmitting mechanism 118 forms no part of the present invention and exercises no control over feathering and, therefore, it will not be described in further detail. The power lever control of feathering is exercised through the feathering cam 114 and motion transmitting means associated therewith as will now be described.

When the power lever 104 is placed in a predetermined position to effect feathering, it places the cam 114 in the rotated position shown in FIG. 2 wherein the high point or radially greater portion of the said cam thrusts a follower 120 toward the right. The follower 120 is connected through a pivoted link 122 with a pivotally supported arm 124 and pivots the said arm counterclockwise against the force of a spring 126. The swinging end of the arm 124 is connected to an elongated cam bar 128 which is thrust toward the right and rides upwardly on a roller 130. A lever 132 which is pivotally supported between its ends on an arm 134 is engaged at one end by the cam bar 128 and pivoted counterclockwise. The other or left-hand end of the lever 132 is engaged with the lower end of a depending extension 136 of the feathering valve 32 and pulls the said valve down against the force of a spring 138.

When the feathering valve 32 is thrust downwardly by the aforedescribed manually operable mechanical means, or by any other means, a connection is effected between the pump conduit 28 and the high pitch inlet conduit 30 whereby to cause the pitch changing mechanism to effect a pitch change through high pitch into the feathered position. Also in the down position of the feathering valve, the low pitch conduit 26 is connected with the main drain conduit 80. Obviously, the feathering valve will be restrained in the down position as long as the power lever remains in its predetermined position for feathering, thereby assuring pitch change to the full feathered position and also assuring that the feathered position will be maintained.

A further result of thrusting the feathering valve down to its feathering position is to cause the standby pump to cooperate with the main pump 62 in supplying pressurized hydraulic fluid to the pitch changing mechanism. That is, when the feathering valve 32 is thrust downwardly, the passage between the standby conduit 70 and the standby valve conduit 70a is closed. This causes the pressure to increase in the conduit 70 sufficiently to open the check valve 74 whereupon the standby flow is directed to the main pump conduit 22. When the conduit 70a is closed at the feathering valve, the standby valve 72 is closed by its spring, and the said standby valve will be closed to prevent standby drain at any other time when standby pressure falls below a predetermined level. This assures an established standby pressure at all times in the standby conduit 70.

The electrically operable means for operating the feathering valve 32 includes the solenoid operated, normally closed actuating or check valve 90. When this valve is energized, the armature 140 closes the drain conduit 94 and opens the ball check to accommodate flow of hydraulic fluid at pump pressure from the conduit 96 into the conduit 98. As previously mentioned, the conduit 98 communicates at the valve 92 with the conduit 100 and thus, the pressurized fluid enters the conduit 102 and the actuating chambers at the tops of the feathering valve and the pilot valve.

Obviously, hydraulic fluid under pressure in the said actuating chambers will bias the feathering valve and the pilot valve downwardly. When the feathering valve is thrust into its feathering position, the pitch changing mechanism will receive hydraulic fluid to feather the propeller blades as hereinbefore described. When the pilot valve is thrust downwardly, a high pitch change is effected as previously described. The high pitch operation of the pitch changing mechanism under control of the pilot valve can be continued by hydraulic pressure actuation of the pilot valve until the propeller blades are fully feathered, in the event the feathering valve cannot be moved downwardly. Thus, energizing the solenoid operated feather actuating valve 90 will operate the feathering valve to effect feathering or, in the event the feathering valve cannot be moved from its normal position, the pilot valve will be operated to cause feathering.

While not shown in the drawings, the power circuit for energizing the solenoid in the valve 90 is preferably adapted to remain closed after initial closing until it is manually opened, thus maintaining hydraulic flow to the feathering valve and the pilot valve to maintain the feathered condition until it is desired to unfeather the propeller.

The aforedescribed electrically operable actuating means and the previously described manually operable means for operating the feathering valve can obviously be used independently of each other or in cooperation. When both means are employed, the hydraulic force in the feathering valve actuating chamber assists the manually operated mechanism in holding the feathering valve in its down or feathering position. It can be said that one means of feathering is a safety for the other.

It is an important feature of the present invention that additional safety means is provided to assure feathering in the event that the electrically operable valve 90 is inoperative and/or in the event that the feathering valve cannot be moved to the feathering position by the manually operable means described. Included in this safety structure is the feather actuating or check valve 92 which is operated by the manually controlled mechanism which operates normally on the feathering valve 32. The said mechanism automatically becomes effective to operate the feather actuating valve 92 if and when the feathering valve 32 sticks in the normal or up position. In such event, when the cam bar 128 is thrust to the right and upwardly, it causes the lever 132 to be pivoted about its left-hand end at the valve extension 136 rather than about the pivot between its ends. Pivoting of the lever 132 about its left-hand end causes the pivotally supported arm 134 also to be pivoted counterclockwise about its pivotally connected left-hand end, and the right-hand end of the said arm thrusts upwardly the feather actuating valve 92. Normally, however, the lever 132 is pivoted about its connection with the arm 134 to move the feathering valve 32 downwardly. That is, the force of the spring 138 in holding the feathering valve up is so much less than the force of springs 101 and 103 holding the valve 92 down that the lever 132 will pivot about its connections with arm 134 to move the feathering valve 32 downwardly. It is only when the feathering valve sticks in its up position as described that the total force on the feathering valve is greater than on the actuating valve 92. When this occurs, the lever 132 pivots about its left-hand end and moves the valve 92 upwardly to the position shown in FIG. 2.

When the actuating valve 92 is thrust upwardly, it closes the conduit 98 and opens the spring biased ball check, this causing pressurized flow from the conduit 96 to the conduit 100 and on to the conduit 102 and the actuating chambers at the tops of the feathering valve 32 and the pilot valve 34. The hydraulic force applied in the aforedescribed manner to the top of the feathering valve is substantially greater than the force applied to the feathering valve by the spring 138 and should cause it to move downwardly to the feathering position, but in the event it does not, the pilot valve will be thrust downwardly and held down by hydraulic pressure. It should be understood that in all circumstances the hydraulic pressure supplied from the source and applied to the feathering valve and to the pilot valve exerts a greater force on the said valves than their respective springs 138 and 52. Therefore, if the feathering valve remains in the up position, the pilot valve will be operated to effect a pitch change through high pitch into the feathered position. The pilot valve will be held in the down position by hydraulic pressure as long as the power lever 104 remains in the predetermined "feather" position to hold the feather actuating check valve in the open position by the aforedescribed mechanical motion transmitting mechanism.

The invention claimed is:

1. In an aeronautical propeller of the type having a pitch changing mechanism which is operable in response to fluid pressure to effect a blade angle change through high pitch into a feathered position, the combination comprising a source of fluid under pressure, an inlet conduit connected with the pitch changing mechanism, feather control means connected between the source and the conduit including a feathering valve movable to one position to effect direct communication therebetween at said feathering valve and also including a valve actuating chamber, mechanical valve moving mechanism connected with the valve and normally operable to move the same to the said one position, and safety means for moving the feathering valve to its said one position in the event the mechanical mechanism cannot do so, said safety means comprising conduit means interconnecting said source and the valve actuating chamber and a normally closed actuating valve disposed in the conduit means, means for connecting the actuating valve with the mechanical valve moving mechanism and said actuating valve being operable thereby to open said conduit means whereby to introduce fluid under pressure to the actuating chamber to urge the feathering valve to its said one position.

2. In an aeronautical propeller of the type having a pitch changing mechanism which is fluid pressure operated to effect a blade angle change through high pitch into a feathered position, the combination comprising a source of fluid under pressure, an inlet conduit connected with the pitch changing mechanism, control means for introducing fluid under pressure from the source to the conduit including a feathering valve and a pilot valve, the said feathering valve being connected between the source and the pilot valve and normally positioned to prevent direct flow from the source to the conduit at the feathering valve but being movable to one position to permit direct flow from the source to the conduit at the feathering valve, the said pilot valve being connected through the feathering valve between the source and the conduit and normally positioned to prevent flow therebetween but being movable to one position to permit flow therebetween, and the said pilot valve being provided with an actuating chamber adapted to receive fluid under pressure for moving the pilot valve to its said one position, the said control means also including valve moving mechanism connected with the feathering valve and normally operable to move it to its said one position whereby to effect feathering, and safety means for feathering in the event the feathering valve cannot be moved from its normal position, the said safety means comprising conduit means interconnecting said source and the said actuating chamber and a normally closed actuating valve disposed in the conduit means, the actuating valve being connected to the said valve moving mechanism and operable thereby to open said conduit means whereby to introduce fluid under pressure to said actuating chamber.

3. In an aeronautical propeller of the type having a pitch changing mechanism whch is fluid pressure operated to effect a blade angle change through high pitch into a feathered position, the combination comprising a source of fluid under pressure, an inlet conduit connected to the pitch changing mechanism, control means for feathering the propeller including a feathering valve and a pilot valve, the said feathering valve being connected between the source and the conduit and normally positioned to prevent direct flow therebetween at the feathering valve but being movable to one position to permit direct flow therebetween at the feathering valve, and the said feathering valve being provided with an actuating chamber adapted to receive fluid under pressure for moving the feathering valve to its said one position, the said pilot valve being connected through the feathering valve between the source and the conduit and normally positioned to prevent flow therebetween but being movable to one position to permit flow therebetween and the said pilot valve being provided with an actuating chamber adapted to receive fluid under pressure for moving the pilot valve to its said one position, the said control means also including valve moving mechanism connected with the feathering valve and normally operable to move it to its said one position whereby to effect feathering, and safety means for feathering in the event the feathering valve cannot be moved from its normal position, the said safety means comprising conduit means interconnecting said source and said actuating chambers and a normally closed actuating valve disposed in the conduit means, the actuating valve being connected with the said valve moving mechanism and operable thereby to open said conduit means whereby to introduce fluid under pressure to said actuating chambers.

4. In an aeronautical propeller of the type having a pitch changing mechanism which is fluid pressure operated to effect a blade angle change through high pitch into a feathered position, the combination comprising a source of fluid under pressure, an inlet conduit connected with the pitch changing mechanism, control means connected between the source and the conduit including a feathering valve and a pilot valve, the said feathering valve being connected between the source and the pilot valve and also connected between the source and the conduit and normally positioned to prevent direct flow from the source to the conduit at the feathering valve while permitting flow from the source to the pilot valve but being movable to one position whereby to permit direct flow from the source to the conduit at the feathering valve, the said pilot valve being connected between the feathering valve and the conduit and normally positioned to prevent flow to the conduit but being movable to one position to permit flow to the conduit and the said pilot valve being provided with an actuating chamber adapted to receive fluid under pressure for moving the pilot valve to its said one position, the said control means also including valve moving mechanism connected with the feathering valve and normally operable to move it to its said one position whereby to effect feathering, and safety means for feathering in the event the feathering valve cannot be moved from its normal position, the said safety means comprising conduit means interconnecting said source and said actuating chamber and a normally closed actuating valve disposed in the conduit means, the actuating valve being connected with the said valve moving mechanism and operable thereby to open said conduit means whereby to introduce fluid under pressure to said actuating chamber.

5. In an aeronautical propeller of the type having a pitch changing mechanism which is fluid pressure operated to effect a blade angle change through high pitch into a feathered position, the combination comprising a source of fluid under pressure, an inlet conduit connected with the pitch changing mechanism, control means connected between the source and the conduit including a feathering valve and a pilot valve, the said feathering valve being connected between the source and the pilot valve and also connected between the source and the conduit and normally positioned to prevent direct flow from the source to the conduit at the feathering valve while permitting flow from the source to the pilot valve but being movable to one position whereby to permit direct flow from the source to the conduit at the feathering valve and the said feathering valve being provided with an actuating chamber adapted to receive fluid under pressure for moving the feathering valve to its said one position, the said pilot valve being connected between the feathering valve and the conduit and normally positioned to prevent flow to the conduit but being movable to one position to permit flow to the conduit and the said pilot valve being provided with an actuating chamber adapted to receive fluid under pressure for moving the pilot valve to its said one position, the said control means also including valve moving mechanism connected with the feathering valve and normally operable to move it to its said one position whereby to effect feathering, and safety means for feathering in the event the feathering valve cannot be moved from its normal position, the said safety means comprising conduit means interconnecting said source and said actuating chambers and a normally closed actuating valve disposed in the conduit means, the actuating valve being connected with the said valve moving mechanism and operable thereby to open said conduit means whereby to introduce fluid under pressure to said actuating chambers.

6. The combination in an aeronautical propeller as defined in claim 1 wherein the valve moving mechanism comprises a manually operable cam and motion transmitting means connected with the feathering valve and operable by said cam.

7. The combination in an aeronautical propeller as defined in claim 2 wherein the valve moving mechanism comprises a manually operable cam and motion transmitting means connected with the feathering valve and connected with said actuating valve.

8. The combination in an aeronautical propeller as defined in claim 5 wherein the valve moving mechanism comprises a manually operable cam and motion transmitting means connected with the feathering valve and with the actuating valve and operable by said cam.

9. In a hydraulic system, a variable pitch propeller having hydraulic operating means for adjusting the pitch of the blades of the propeller, a source of hydraulic fluid, a hydraulic governor connected to said source of fluid, hydraulic fluid passages connecting said governor to said operating means, said governor having valving serving to control the application of hydraulic fluid to said passages, an additional source of hydraulic fluid, means for applying fluid from said additional source to condition said valving to cause the application of fluid from said additional source to said passages to cause said operating means to feather the propeller, and additional means having hydraulic connection with said additional source of fluid and with said operating means for effecting feathering independent of conditioning of said valving, said additional means including a fluid passage connected to said operating means and said additional source, a valve movable between first and second positions to control the flow of fluid through said last named fluid passage, means yieldably urging said valve to its first position, and means for causing the application of fluid under pressure from said additional source to said valve to move said valve from its first to its second position against the force of the yieldable means, said valve in said second position permitting flow of fluid from said additional source to said operating means to effect feathering of the propeller.

References Cited in the file of this patent
UNITED STATES PATENTS

| | | |
|---|---|---|
| 2,626,669 | Moore | Jan. 27, 1953 |
| 2,727,253 | Moore et al. | Mar. 6, 1956 |
| 2,761,517 | Detamore et al. | Sept. 4, 1956 |
| 2,761,519 | Hirsch | Sept. 4, 1956 |